United States Patent
Bapna

(10) Patent No.: US 10,448,121 B1
(45) Date of Patent: Oct. 15, 2019

(54) TWO-STAGE CONTENT ITEM SELECTION PROCESS INCORPORATING BRAND VALUE

(71) Applicant: Facebook, Inc., Menlo Park, CA (US)

(72) Inventor: Abhishek Bapna, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 16/006,584

(22) Filed: Jun. 12, 2018

(51) Int. Cl.
| | |
|---|---|
| *H04N 21/258* | (2011.01) |
| *H04N 21/81* | (2011.01) |
| *G06Q 50/00* | (2012.01) |
| *H04N 21/442* | (2011.01) |
| *H04N 21/44* | (2011.01) |
| *H04N 21/45* | (2011.01) |
| *G06Q 30/02* | (2012.01) |
| *H04N 21/25* | (2011.01) |
| *H04N 21/234* | (2011.01) |

(52) U.S. Cl.
CPC ....... *H04N 21/812* (2013.01); *G06Q 30/0277* (2013.01); *G06Q 50/01* (2013.01); *H04N 21/23424* (2013.01); *H04N 21/252* (2013.01); *H04N 21/25891* (2013.01); *H04N 21/44016* (2013.01); *H04N 21/44204* (2013.01); *H04N 21/4532* (2013.01)

(58) Field of Classification Search
CPC ........... H04N 21/812; H04N 21/44016; H04N 21/44204; H04N 21/4532; H04N 21/23424; H04N 21/25891; H04N 21/252; G06Q 30/0277; G06Q 50/01
See application file for complete search history.

(56) References Cited

U.S. PATENT DOCUMENTS

| | | | | |
|---|---|---|---|---|
| 8,434,104 | B2* | 4/2013 | Weihs ................. | H04N 21/812 725/34 |
| 9,092,489 | B1* | 7/2015 | Dasilva ............. | H04N 21/2407 |
| 9,870,403 | B1* | 1/2018 | Teng ................. | G06Q 30/0282 |
| 2013/0204710 | A1* | 8/2013 | Boland ............. | G06Q 30/0241 705/14.66 |
| 2013/0325550 | A1* | 12/2013 | Varghese .......... | G06Q 30/0202 705/7.31 |
| 2018/0174172 | A1* | 6/2018 | Hughes ............. | G06Q 30/0276 |

* cited by examiner

*Primary Examiner* — Pankaj Kumar
*Assistant Examiner* — Alexander Boyd
(74) *Attorney, Agent, or Firm* — Fenwick & West LLP

(57) ABSTRACT

An online system presents content in videos to users. Content providers may value having their content injected into videos from certain sources more than others. This preference is quantified as a brand value score. The brand value score is determined as a function of user engagement with a source of the video and, to account for brand value, the system performs a two-stage auction. First, the system determines whether to inject any content into a video by determining a distribution of brand value of videos per demand for videos in a previous period and filling a projected demand for the content in a current period to determine a brand value threshold. Then, any videos having a brand value above the threshold are eligible for the second stage of the selection process where the system performs an auction where projected benefit of presenting the content is compared to projected loss.

20 Claims, 3 Drawing Sheets

TWO-STAGE CONTENT ITEM SELECTION PROCESS INCORPORATING BRAND VALUE

BACKGROUND

This disclosure relates generally to identifying content items for presentation to users of an online system, and more particularly to performing a two-stage selection process for presenting content items in videos that incorporates a brand value associated with a source of the videos.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a user for presenting online system users with certain types of sponsored content provided by this type of user. Frequently, online systems charge a user for each presentation of sponsored content to an online system user or for each interaction with sponsored content by an online system user. For example, an online system receives compensation from a user each time a content item provided by the publishing user is displayed to another user on the online system or each time another user is presented with a content item on the online system and interacts with the content item (e.g., selects a link included in the content item), or each time another user performs another action after being presented with the content item.

Content items may be associated with targeting criteria that identify characteristics of online system users eligible to be presented with the content item. For example, a content item is eligible to be presented to an online system user having characteristics satisfying at least a threshold amount of targeting criteria associated with the content item; however, the content item is not eligible to be presented to another online system user having characteristics satisfying less than the threshold amount of targeting criteria associated with the content item. Targeting criteria associated with a content item are often specified by a user providing the content item to an online system, and allow an online system to identify users who are most likely to be interested in being presented with a particular content item as eligible be presented with the content item.

SUMMARY

An online system receives content items for presentation in videos to users of the online system. Each content item may include targeting criteria and a bid amount. A content item provider, such as an advertiser, may want to present their content items or advertisements for their products or services with videos from certain sources more than others and this preference is quantified as a brand value score. The brand value score, in one embodiment, is determined as a function of user engagement with a source of the video, such as a brand page within the online system, or other content related to the source. Each brand, in one embodiment, has a brand page in the online system and their brand value is determined as a metric for determining whether it is worthwhile or not to present a content item within videos provided by this brand.

Accordingly, the online system obtains a number of video views for each of a number of videos presented to users of the online system for a previous time period (e.g., the last hour, last 24 hours, etc.). The online system also obtains user interactions corresponding to users of the online system interacting with the source (e.g., brand page, company, website, etc.) of these videos and the user interactions are performed by users in association with the source. In one embodiment, user interactions with the brand page of a source are used as a proxy for the brand value for a given video. The user interactions include users commenting on the brand page, sharing the brand page with at least one other user, re-posting or sharing content posted by or on the brand page, expressing a preference for the brand representing the brand page, and so forth. High user interaction with a source and, in particular, repeated engagement with the source over a period of time (e.g., the same user regularly commenting and/or sharing content from the source over time, etc.), is a relevant indication of user interest and, therefore, brand value.

To account for brand value, the online system performs a two-stage auction, where the online system first determines whether to inject any content item into a video. In one embodiment, this is a binary determination made by determining a distribution of brand value of videos per demand for videos (e.g., in a previous period) and filling a projected content item demand in a current period to determine the brand value threshold or cutoff. Then, any videos having a brand value above the brand value threshold will be eligible to have content items injected therein. In a second stage, the online system performs an auction in which the projected benefit (e.g., ECPM bid plus organic score) is compared to the projected loss (e.g., engagement loss plus brand value) to determine whether the content item will be injected at certain locations in the video.

With the user interactions, the online system first determines a brand value for each video and the distribution of brand value video views is generated in order to determine the brand value threshold. In one embodiment, the distribution of brand values is a histogram of video views by the brand value of each video. However, the brand value video views can be ranked from highest brand value to lowest brand value instead. The online system then determines, for a current time period, a content item inventory. The online system determines the brand value threshold for the current time period based on the content item inventory by allocating each content item in inventory to a video view from the previous time period. For example, each content item in the content item inventory is allocated to a video view from the previous time period starting with the highest brand value video views first until all the content items in the content item inventory have been allocated to a video view from the previous time period. Accordingly, the brand value of the lowest allocated video view defines the brand value threshold.

Accordingly, for each video impression opportunity to present a content item within a video to a user in the current time period, the online system determines the brand value for the video corresponding to the video impression opportunity. Then, the online system determines whether the brand value for the video is greater than the brand value threshold.

If the brand value for the video being greater than the brand value threshold, the online system performs a selection process to select a content item for inclusion within the video. In one embodiment, the selection process includes computing an affinity score between the user and candidate content items based on the targeting criteria associated with each of the candidate content items and selecting a candidate content item for inclusion in the video based on the computed affinity score and a bid amount associated with the candidate content item. However, if the brand value for the video is less than the brand value threshold, the process ends, the online system does not perform the selection process and instead allows the video to be presented to a viewing user without a content item therein.

Accordingly, the two-stage selection process for presenting content items in videos that incorporates a brand value associated with a source of the videos addresses a problem that arises specifically in online content distribution systems, which is how to pair an inventory of content items with a projected demand for a larger set of video views. The first stage determination of whether to participate in the selection process provides a first content filter that is faster and more computationally efficient to initially perform than to perform in conjunction with the content item selection stage (second stage). Thus, using the first stage as a condition for conducting the second stage beneficially improves system performance, particularly, for the delivery of videos that would not have passed the first stage filter.

Figure 1:
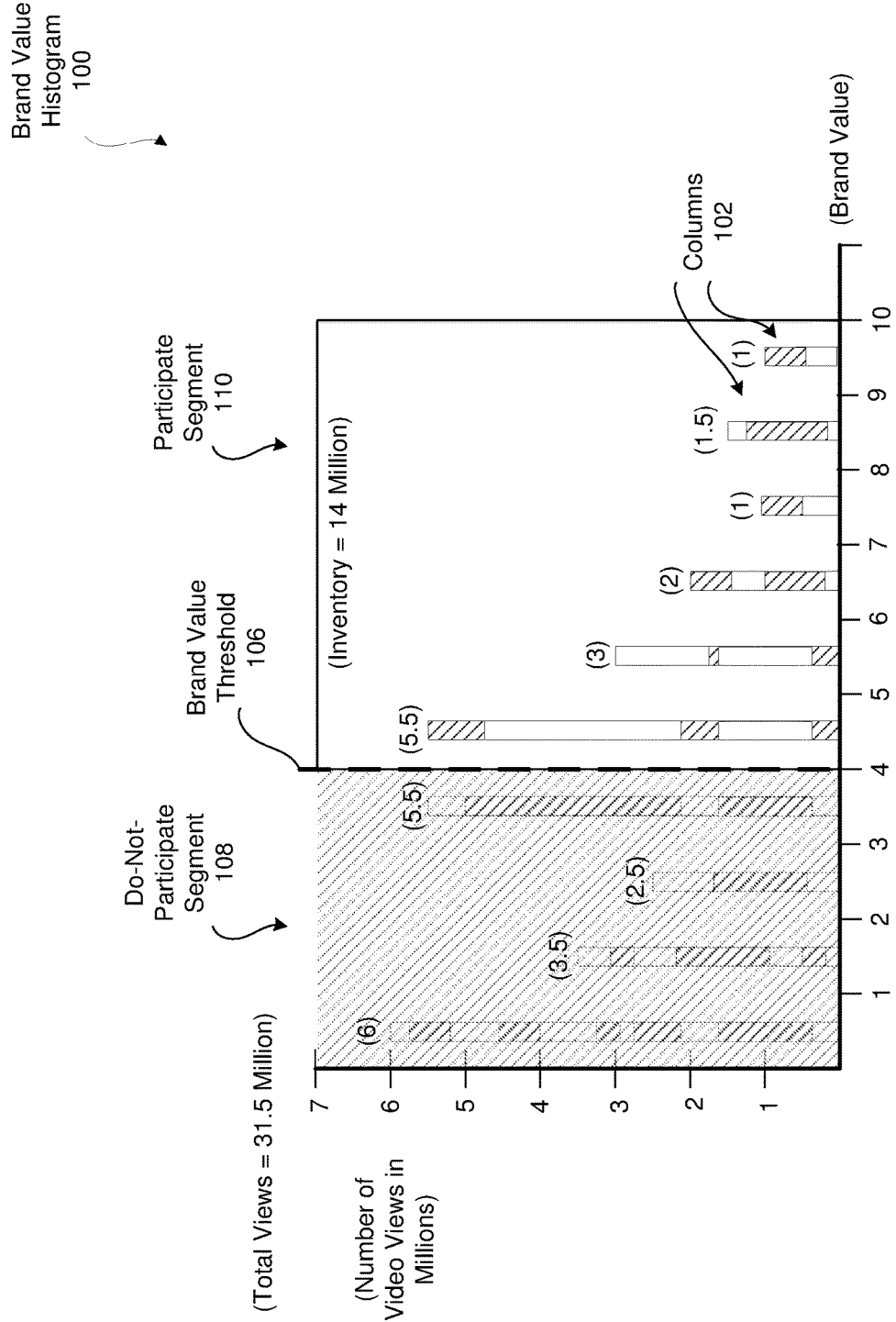
FIG. 1 is a histogram of video views by brand value, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online system presents content items in videos delivered to users of the online system. A content item provider may value having their content items presented with videos from certain sources more than others and this preference is quantified as a brand value score. The brand value score may be determined as a function of user engagement with a source of the video, such as a brand page within the online system, or other content related to the source. For example, the video could be highlights from a football game provided by the National Football League (NFL) and the source could be the NFL brand page within (or maintained by) the online system. Other example brand pages include the brand page for Coca-Cola, Disney, Comedy Central, PG&E, and so forth. Each brand associated with these brand pages may provide video content to users of the online system and their brand value is determined as a metric for determining whether it is worthwhile or not to present a content item within videos they provide.

The online system obtains video views for at least a subset of videos presented to users during a previous time period (e.g., the last hour, last 24 hours, etc.). The online system also obtains user interactions corresponding to users of the online system interacting with the source of these videos. The source, in one embodiment, is a brand page providing one or more videos to the users of the online system and the user interactions are performed by users in association with the brand page. The user interactions include users commenting on a video, expressing a preference for the video, sharing the video with at least one other user, posting the video to their user profile, and so forth. The user interactions, however, are not limited to the videos themselves and may additionally or instead be directed at the brand page itself. These interactions include commenting on the brand page, sharing the brand page with at least one other user, reposting or sharing content posted by or on the brand page, expressing a preference for the brand representing the brand page, and so forth. High user interaction with a source and, in particular, repeated engagement with the source over a period of time (e.g., the same user regularly commenting and/or sharing content from the source over time, etc.), is a relevant indication of user interest and, therefore, brand value. Thus, the brand value is quantified as a function of user engagement, retention, and/or loyalty. Prior scoring models have not accounted for the brand value and, yet, this is a source of value motivating content item insertion in many videos.

Accordingly, in order to account for the brand value of these brands in determining whether to present a content item in a video, the online system performs a two-stage selection process. Thus, for a particular opportunity to present a content item in a video to a user, the online system first determines whether to present the content item in the video at all by filling a projected content item demand in a current period to determine a cutoff brand value or threshold. This determination is made by determining a distribution of brand values of videos per demand for videos in a previous period (e.g., the last 24 hours, week, etc.). Then, any videos having a brand value above the cutoff are eligible to have content items presented therein. In a second stage, the system performs an auction in which the projected benefit is compared to the projected loss to determine whether the content item will be presented with the video.

A distribution of brand value of video views is determined in order to determine the cutoff brand value or brand value threshold. FIG. 1 shows a brand value histogram 100 of a number of video views by brand value, in accordance with an embodiment. As described above, the brand value is determined for each brand (Brand A, Brand B . . . , Brand Z) and brand value histogram 100 shows each brand ranked from highest brand value to lowest brand value based on the number of video views per million. A height of each column 102 in the brand value histogram 100 represents the number of views for that particular range of brand values. For example, Brand value histogram 100 shows that there were 6 million video views in this time period for brands with a brand value between 0 and 1 by this scale. There were also 3.5 million video views for brands with a brand value between 1 and 2; 2.5 million video views for brands with a brand value between 2 and 3; 5.5 million video views for brands with a brand value between 3 and 4; 5.5 million video views for brands with a brand value between 4 and 5; 3 million video views for brands with a brand value between 5 and 6; 2 million video views for brands with a brand value between 6 and 7, 1 million video views for brands with a brand value between 7 and 8; 1.5 million video views for brands with a brand value between 8 and 9; and 1 million video views for brands with a brand value between 9 and 10. Each different patterned segment in each column 102 represents a different brand in that column 102. In total, there were 31.5 million video views for this time period.

For a current time period, the online system obtains content item inventory for content items to be present within the videos in order to determine the brand value threshold. Accordingly, the online system determines the brand value threshold by allocating each content item in the content item inventory to a video view from the previous time period. This is achieved by mapping the total number of videos views (from the previous time period) to the total number of content items in inventory (for the current time period) by filling or allocating the content items to the video views with the highest brand value until all the content items have been allocated. The resulting brand value of the lowest allocated video view, therefore, defines the brand value threshold for the first stage selection process.

Referring to FIG. 1, the online system has 14 million content items to present to users within videos for the current time period and there were 31.5 million video views in the previous period. Thus, in order to determine the brand value threshold for the current item period, content items in inventory for the current time period are allocated to views from the previous time period starting with the views having the highest brand value first. Accordingly, inventory covers all views corresponding to video views with brand values between 9 and 10 (e.g., 1 million), 8 and 9 (e.g., 1.5 million), 7 and 8 (e.g., 1 million), 6 and 7 (e.g., 2 million), 5 and 6 (e.g., 3 million), and 4 and 5 (e.g., 5.5 million). However, there are no more content items in inventory for video views having a brand value less than 4, which is assigned the brand value threshold 106 for the current period. Therefore, videos originating from a source having a brand value greater than 4, in this example, is part of a participation segment 110 and videos originating from a source having a brand value less than 4 are part of a do-not-participate segment 108.

As described in greater detail below, video impression opportunities for videos from a source with a brand value greater than or at least equal to the brand value threshold 106 for the current period are eligible to have content items presented therein with the videos. Accordingly, in a second stage, the online system then performs an auction in which the projected benefit (e.g., ECPM bid plus organic score) of presenting the content item with the video is compared to the projected loss (e.g., engagement loss plus brand value) of presenting the content item with the video to determine whether it is worthwhile to present the content item with the video.

System Architecture

Figure 2:
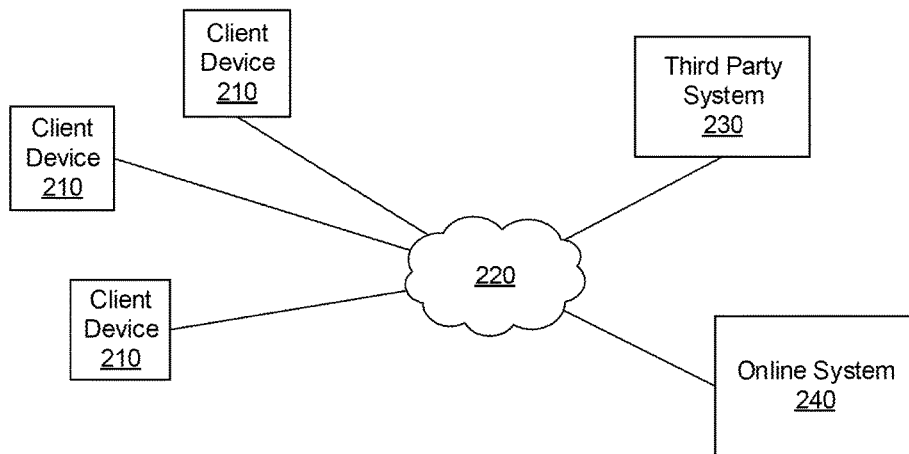
FIG. 2 is a block diagram of a system environment in which an online system operates, in accordance with an embodiment.

FIG. 2 is a block diagram of a system environment 200 for an online system 240. The system environment 200 shown by FIG. 2 comprises one or more client devices 210, a network 220, one or more third-party systems 230, and the online system 240. In alternative configurations, different and/or additional components may be included in the system environment 200. For example, the online system 240 is a social networking system, a content sharing network, or another system providing content to users.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, or another suitable device. A client device 210 is configured to communicate via the network 220. In one embodiment, a client device 210 executes an application allowing a user of the client device 210 to interact with the online system 240. For example, a client device 210 executes a browser application to enable interaction between the client device 210 and the online system 240 via the network 220. In another embodiment, a client device 210 interacts with the online system 240 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the online system 240, which is further described below in conjunction with FIG. 3. In one embodiment, a third party system 230 is an application provider communicating information describing applications for execution by a client device 210 or communicating data to client devices 210 for use by an application executing on the client device. In other embodiments, a third party system 230 provides content or other information for presentation via a client device 210. A third party system 230 may also communicate information to the online system 240, such as advertisements, content, or information about an application provided by the third party system 230.

The online system 240 is also capable of linking a variety of entities. For example, the online system 240 enables users to interact with each other as well as external websites provided by the third party systems 230 or other entities through an API or other communication channels. Thus, the online system 240 generates and maintains a "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, events, messages, concepts, and any other things that can be represented by an object in the online system 240. An edge between two nodes in the social graph represents a particular kind of connection between the two nodes, which may result from an action that was performed by one of the nodes on the other node. For example, when a first user identifies a second user as a friend, an edge in the social graph is generated connecting a node representing the first user and a second node representing the second user. As various nodes interact with each other, the online system 240 modifies edges connecting the various nodes to reflect the interactions.

Figure 3:
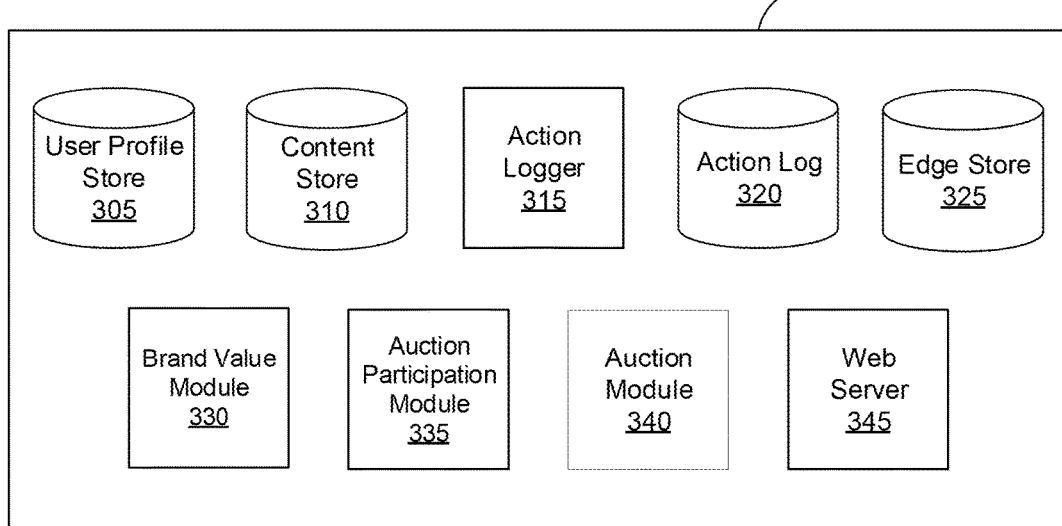
FIG. 3 is a block diagram of an online system, in accordance with an embodiment.

FIG. 3 is a block diagram of an architecture of the online system 240. The online system 240 shown in FIG. 3 includes a user profile store 305, a content store 310, an action logger 315, an action log 320, an edge store 325, brand value module 330, auction participation module 335, auction module 340, and a web server 345. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 305. A user profile includes declarative information about the user that was explicitly shared by the user and may also include profile information inferred by the online system 240. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the online system 240, user profiles may also be stored for entities such as businesses or organizations. This allows an entity to establish a presence on the online system 240 for connecting and exchanging content, such as videos, with other online system users. The entity may post information about itself, about its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity. As described above, each of the brands associated with a brand pages may provide video content to users of the online system and their brand value is determined as a metric for determining whether it is worthwhile or not to present a content item within videos provided by these entities or sources.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 240, events, groups or applications. In some embodiments, objects are received from third-party applications or third-party applications separate from the online system 240. In one embodiment, objects in the content store 310 represent single pieces of content, or content "items." Hence, online system users are encouraged to communicate with each other by posting text and content items of various types of media to the online system 240 through various communication channels. This increases the amount of interaction of users with each other and increases the frequency with which users interact within the online system 240.

One or more content items included in the content store 310 include in-stream content for presentation to a user in a video and a bid amount associated with the presentation of the content item in the video. In one embodiment, the content item is an advertisement provided by an advertiser, the bid amount is included in a content item by the advertiser, and is used to determine an expected value, such as monetary compensation, provided by the advertiser to the online system 240 if the content item is presented in a video to a user, if the content item receives a user interaction when presented, or if any suitable condition is satisfied when content in the content item is presented to a user. For example, the bid amount included in a content item specifies a monetary amount that the online system 240 receives from a user who provided the content item to the online system 240 if content in the content item is displayed. In some embodiments, the expected value to the online system 240 of presenting the content from the content item may be determined by multiplying the bid amount by a probability of the content of the content item being accessed by a user.

In various embodiments, a content item includes various components capable of being identified and retrieved by the online system 240. Example components of a content item include: a title, text data, image data, audio data, video data, a landing page, a user associated with the content item, or any other suitable information. The online system 240 may retrieve one or more specific components of a content item for presentation in some embodiments. For example, the online system 240 may identify a title and image data from a content item and provide the title and the image data for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 240 logs interactions between users presented with the content item or with objects associated with the content item. Additionally, the online system 240 receives compensation from a user associated with content item as online system users perform interactions with a content item that satisfy the objective included in the content item.

Additionally, a content item may include one or more targeting criteria specified by the source, entity, or user who provided the content item to the online system 240. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 240. Targeting criteria may also specify interactions between a user and objects performed external to the online system 240, such as on a third party system 230. For example, targeting criteria identifies users that have taken a particular action, such as sent a message to another user, used an application, joined a group, left a group, joined an event, generated an event description, purchased or reviewed a product or service using an online marketplace, requested information from a third party system 230, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 315 receives communications about user actions internal to and/or external to the online system 240, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 240 to track user actions on the online system 240, as well as actions on third party systems 230 that communicate information to the online system 240. Users may interact with various objects on the online system 240, and information describing these interactions is stored in the action log 320. Examples of interactions with objects include: commenting on posts, sharing links, checking-in to physical locations via a client device 210, accessing content items, and any other suitable interactions. Additional examples of interactions with objects on the online system 240 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 240 as well as with other applications operating on the online system 240. In some embodiments, data from the action log 320 is used to infer interests or preferences of a user, augmenting the interests included in the user's user profile and allowing a more complete understanding of user preferences.

The action log 320 may also store user actions taken on a third party system 230, such as an external website, and communicated to the online system 240. For example, an e-commerce website may recognize a user of an online system 240 through a social plug-in enabling the e-commerce website to identify the user of the online system 240. Because users of the online system 240 are uniquely identifiable, e-commerce web sites, such as in the preceding example, may communicate information about a user's actions outside of the online system 240 to the online system 240 for association with the user. Hence, the action log 320 may record information about actions users perform on a third party system 230, including webpage viewing histories, advertisements that were engaged, purchases made, and other patterns from shopping and buying. Additionally, actions a user performs via an application associated with a third party system 230 and executing on a client device 210 may be communicated to the action logger 315 by the application for recordation and association with the user in the action log 320.

In one embodiment, the edge store 325 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 240, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 240 over time to approximate a user's interest in an object or in another user in the online system 240 based on the actions performed by the user. A user's affinity may be computed by the online system 240 over time to approximate the user's interest in an object, in a topic, or in another user in the online system 240 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The brand value module 330 determines a brand value for videos being presented to users of the online system 240. The brand value module 330 obtains user interactions and/or connections from action log 320 and/or edge store 325 and computes a brand value for the source of each video based at least in part on a number of user interactions with the source. As described above, the source, in one embodiment, is a brand page of an entity providing or making the video accessible to the users of the online system 240. The user interactions include users commenting on a video, users expressing a preference for the video, users sharing the video with at least one other user, users posting the video to their user profile, commenting on the brand page, sharing the brand page with at least one other user, re-posting or sharing content posted by or on the brand page, expressing a preference for the brand representing the brand page, and so forth. High user interaction with a source and, in particular, repeated engagement with the source over a period of time (e.g., the same user regularly commenting and/or sharing content from the source over time, etc.), is a relevant indication of user interest and, therefore, brand value. Thus, the BV is quantified as a function of user engagement, retention, and/or loyalty. In one embodiment, repeated engagement, retention, or loyalty is quantified as each subsequent user interaction performed by a user with a page within a specified time period being weight heavier than a first user interaction performed by the user with the page.

In one embodiment, the brand value module 330 determines the brand value of a source relative to other sources, such as in a Gaussian or normal distribution of cumulative user interactions within some previous period of time (e.g., the last 24 hours, week, month, etc.). In another example, the brand value of a source is determined as a function of cumulative user interactions and repeated engagement of the users with the source (e.g., a user's second interaction with the source within a particular time period is weighted heavier relative to their first interaction).

The auction participation module 335 is the first of a two-stage selection process for determining whether a content item is presented in-stream with a video based on the brand value of the source of the video. Accordingly, auction participation module 335 obtains a number of video views for a previous time period (e.g., the last hour, last 24 hours, etc.) from the action log 320, identifies the source of each video (e.g., an entity associated with a page in the online system 240), obtains a content item inventory of content items for a current time period from the content store 310, and determines the brand value threshold 106 for the current time period based on the brand values associated with the videos and the content item inventory. In one embodiment, the brand value threshold 106 for the current time period is determined by ranking each of the video views by the brand value of the source of the video and allocating each content item in the content item inventory to a video view from the previous time period starting with the highest brand value video views first until all the content items in the content item inventory have been allocated to a video view from the previous time period. The ranking, in one embodiment, includes generating a histogram of video views by the brand value of each video. If there are more video views than content items in inventory, then the brand value of the source for the lowest allocated video view is used as the brand value threshold for the current time period. In one embodiment, the number of video views for the previous time period is estimated as the projected demand for the videos in the current time period. Thus, the brand value threshold 106 is determined such that the projected demand for the videos (i.e., video views in the previous time period) in the current time period for sources having a brand value at least meeting the brand value threshold equals a number of content items in the content item inventory. Thus, the brand value threshold can change from one time period to another and is not necessarily constant, but dynamic based on the ever changing brand values of the sources as interactions with their content fluctuates, but also based on current content item inventory, which is also not static.

Accordingly, for a given video impression opportunity to present a content item within a video, auction participation module 335 additionally determines whether it is worthwhile for the online system 240 to inject a content item into the video corresponding to the video impression opportunity based on the determined brand value threshold. The video impression opportunity corresponds to an opportunity where the online system 240 may include a content item for presentation with the video; however, it is not always worthwhile to present a content item with the video. Thus, the auction participation module 335 of online system 240 first identifies a source of the video for the video impression opportunity, determines the brand value of the source, and, if the brand value is greater than the brand value threshold for the current time period, auction participation module 335 determines that it is worthwhile for the online system 240 to inject a content item into the video for this video impression opportunity and a content item is then selected in a second stage of the two-stage selection process by auction module 340, as discussed below. However, if the brand value of the source of the video for the video impression opportunity is less than the brand value threshold, auction participation module 335 determines that it is not worthwhile for the online system 240 to inject a content item into the video for this video impression opportunity, the process ends at this stage, and a content item is not selected in the second stage of the two-stage selection process.

In response to the brand value for the video being greater than the brand value threshold, the auction module 340 selects a single content item for presentation with the video for the impression opportunity from a number of candidate content items. The auction module 340 performs an auction in which the projected benefit (e.g., ECPM bid plus organic score) of presenting the content item with the video is compared to the projected loss (e.g., engagement loss plus brand value) of presenting the content item with the video to determine whether it is worthwhile to present the content item with the video. Each content item is associated with targeting criteria and a bid amount. The online system 240 uses the auction process to select a content item to present within the video to a viewing user and the auction module uses the targeting criteria and the bid amount of a content item to select the optimal content item for the viewing user from among the candidate content items. Selecting the optimal content item includes computing an affinity score or organic score between the user and each of the candidate content items based on the targeting criteria associated with each of the candidate content items and selecting a content item for inclusion in the video based on the computed affinity score and the bid amount (e.g., ECPM bid) associated with the candidate content item.

The auction module 340, in one embodiment, may additionally calculate an engagement loss associated with presenting the content item within the video. The engagement loss is the probability of the viewing user selecting the content item to the detriment of finishing the video. While this is a benefit of the provider of the content item or advertiser, in one embodiment, this is a detriment to the video source. Thus, in one embodiment, auction module 340 determines whether to present a content item within a video if the bid amount and affinity score for presenting the content item to the viewing user outweighs the engagement loss and brand value of the video source (i.e., [ECPM+Organic_Score]>[Engagement_Loss+BV]). However, if the bid amount and affinity score for presenting the content item is less than the engagement loss and brand value of the video source, the content item will not be presented with the video.

The web server 345 links the online system 240 via the network 220 to the one or more client devices 210, as well as to the one or more third party systems 230. The web server 345 serves web pages, as well as other content, such as JAVA®, FLASH®, XML and so forth. The web server 345 may receive and route messages between the online system 240 and the client device 210, for example, instant messages, queued messages (e.g., email), text messages, short message service (SMS) messages, or messages sent using any other suitable messaging technique. A user may send a request to the web server 345 to upload information (e.g., images or videos) that are stored in the content store 310. Additionally, the web server 345 may provide application programming interface (API) functionality to send data directly to native client device operating systems, such as IOS®, ANDROID™, or BlackberryOS.

Figure 4:
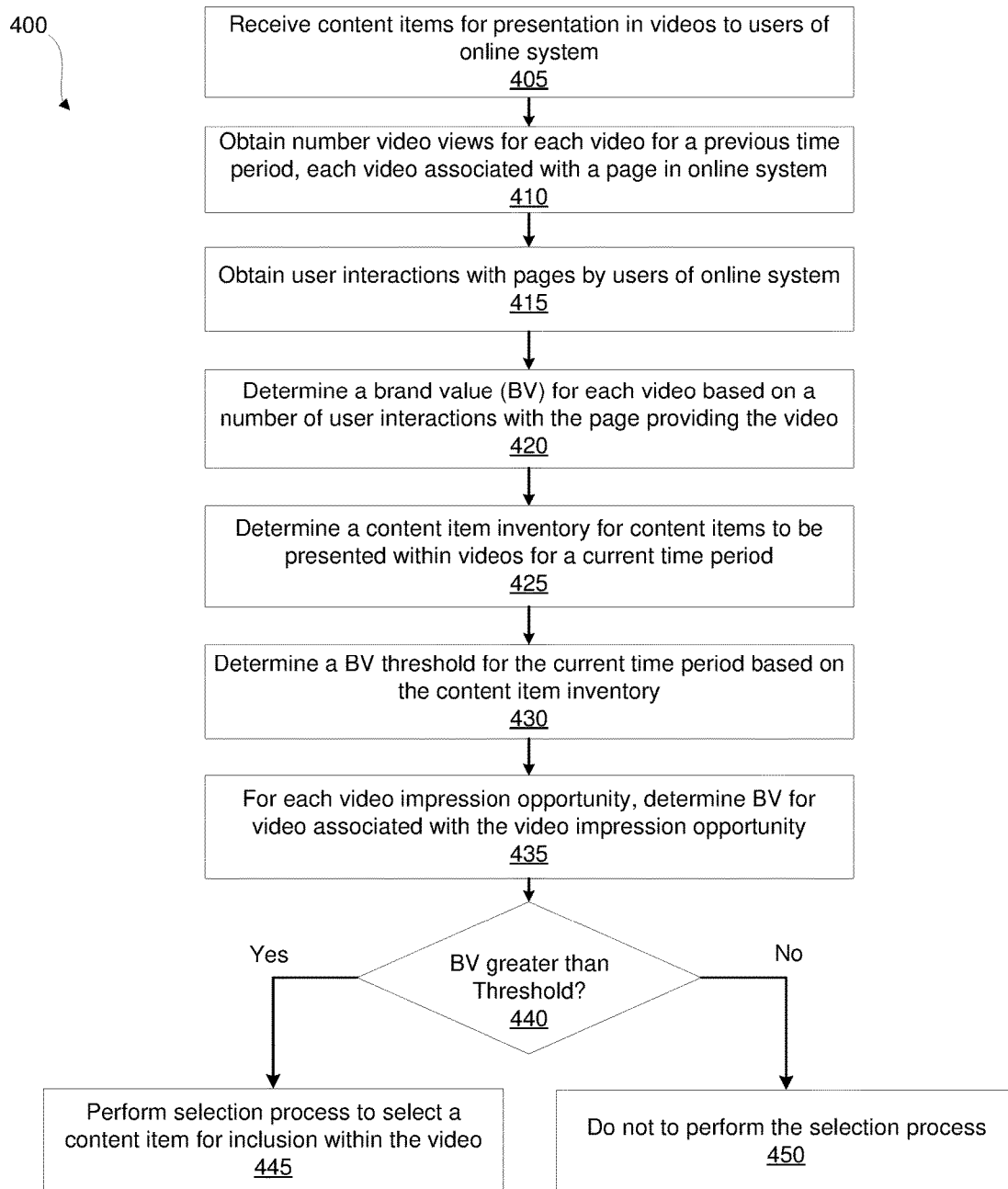
FIG. 4 is a flowchart illustrating a process of presenting a content item within a video based on the brand value of a source of the video, in accordance with an embodiment.

Presenting Content Items within Videos Based on the Brand Value of the Video Sources FIG. 4 is a flowchart illustrating a process 400 of presenting a content item within a video based on the brand value of a source of the video, in accordance with an embodiment. The process 400 may be performed by a single system or two other entities may perform some or all of the steps of the process in other embodiments. Likewise, embodiments may include different and/or additional steps, or perform the steps in different orders.

An online system receives 405 content items for presentation in videos to users of the online system. Each content item may include targeting criteria and a bid amount. A content item provider, such as an advertiser, may want to present their content items or advertisements (e.g., video advertisements) for their products or services with videos from certain sources more than others and this preference is quantified as a brand value score. The brand value score, in one embodiment, is determined as a function of user engagement with a source of the video, such as a brand page within the online system 240, or other content related to the source. As described above, the video could be game highlights provided by the NFL and the source would then correspond to the NFL brand page maintained by the online system 240. Each brand, in one embodiment, has a brand page in the online system 240 and their brand value is determined as a metric for determining whether it is worthwhile or not to present a content item or advertisement within videos provided by this brand. Each video then is associated with a brand page in the online system 240 that provided the video to users of the online system 240.

Accordingly, the online system obtains 410 a number video views for each of a number of videos presented to users of the online system 240 for a previous time period (e.g., the last hour, last 24 hours, etc.). The online system also obtains 415 user interactions corresponding to users of the online system interacting with the brand page of these videos and the user interactions are performed by users in association with the brand page. In one embodiment, user interactions with the brand page are used as a proxy for the brand value for a given video. The user interactions include users commenting on the brand page, sharing the brand page with at least one other user, re-posting or sharing content posted by or on the brand page, expressing a preference for the brand representing the brand page, and so forth. High user interaction with a source and, in particular, repeated engagement with the source over a period of time (e.g., the same user regularly commenting and/or sharing content from the source over time, etc.), is a relevant indication of user interest and, therefore, brand value.

To account for brand value, the online system 240 performs a two-stage auction, where the online system 240 first determines whether to inject any content item into a video. This is a binary determination made by determining a distribution of brand value of videos per demand for videos (e.g., in a previous period) and filling a projected content item demand in a current period to determine the brand value threshold or cutoff. Then, any videos having a brand value above the brand value threshold will be eligible to have content items injected therein. In a second stage, the online system 240 performs an auction in which the projected benefit (e.g., ECPM bid plus organic score) is compared to the projected loss (e.g., engagement loss plus brand value) to determine whether the content item will be injected at certain locations in the video.

With the user interactions, the online system 240 first determines 420 a brand value for each video and the distribution of brand value video views is generated in order to determine the brand value threshold. In one embodiment, the distribution of brand values is a histogram of video views by the brand value of each video. However, the brand value video views can be ranked from highest brand value to lowest brand value instead. The online system 240 then determines 425, for a current time period, a content item inventory. The online system determines 430 the brand value threshold for the current time period based on the content item inventory by allocating each content item in inventory to a video view from the previous time period. For example, each content item in the content item inventory is allocated to a video view from the previous time period starting with the highest brand value video views first until all the content items in the content item inventory have been allocated to a video view from the previous time period. Accordingly, the brand value of the lowest allocated video view defines the brand value threshold. For example, referring back to FIG. 1, the brand value of the lowest allocated video view is between 4 and 5. Therefore, the lowest possible brand value allocated to a video view is 4, in this example, which is the brand value threshold 106. Put another way, the number of video views in the previous time period is estimated as the projected demand for the videos in the current time period and the brand value threshold 106 is determined such that the projected demand for the videos in the current time period for sources having a brand value at least meeting the brand value threshold equals a number of content items in the content item inventory.

Accordingly, for each video impression opportunity to present a content item within a video to a user in the current time period, the online system 240 determines 435 the brand value for the video corresponding to the video impression opportunity. Then, the online system 240 determines whether the brand value for the video is greater than the brand value threshold 440. If the brand value for the video being great than the brand value threshold, the online system 240 performs 445 a selection process to select a content item for inclusion within the video. In one embodiment, the selection process includes computing an affinity score between the user and candidate content items based on the targeting criteria associated with each of the candidate content items and selecting a candidate content item for inclusion in the video based on the computed affinity score and the bid amount associated with the candidate content item. However, if the brand value for the video is less than the brand value threshold 440, the process ends and the online system 240 does not perform 450 the selection process. No content item is selected for inclusion within the video. The video is instead presented to the user without the inclusion of a content item.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A method comprising:
receiving, by an online system, a plurality of content items for presentation in videos to users of the online system, each content item associated with targeting criteria and a bid amount;
obtaining, by the online system, a number of video views for each of a plurality of videos for a previous time period, each video of the plurality of videos being associated with a source of a plurality of sources in the online system that provided the video to users of the online system, the number of video views corresponding to a projected demand for the plurality of videos in a current time period subsequent to the previous time period;
obtaining user interactions with each of the plurality of sources by users of the online system;
determining a brand value for the source of each video of the plurality of videos, the brand value for the source being computed based at least in part on a number of user interactions with the source;
determining, for the current time period, a content item inventory of a plurality of content items to present within videos being presented to the users of the online system in the current time period;
determining a brand value threshold such that the projected demand for the plurality of videos in the current time period for sources of the plurality of sources having a brand value at least meeting the brand value threshold equals a number of content items in the content item inventory;
for each video impression opportunity to present a content item within a video to a user in the current time period,
determining the brand value for the source of the video associated with the video impression opportunity;
determining whether the brand value for the source of the video is greater than the brand value threshold;
responsive to the brand value for the source of the video being greater than the brand value threshold,
selecting, in a selection process with a plurality of candidate content items, a candidate content item for inclusion in the video; and providing the video with the selected content item for presentation to the user for the video impression.

2. The method of claim 1, further comprising:
responsive to the brand value for the source of the video being less than the brand value threshold, allowing the video to be presented to the user without a content item.

3. The method of claim 1, wherein determining the brand value threshold further comprises:
ranking each of the video views by the brand value for the source of the video, and wherein determining the brand value threshold includes allocating the content items in the content item inventory to a portion of the plurality of videos with a highest brand value until all the content items in the content item inventory are allocated.

4. The method of claim 1, wherein determining the brand value threshold further comprises:
generating a histogram of video views by the brand value for the source of each video of the plurality of videos.

5. The method of claim 1, wherein the user interactions include at least one of users of the online system commenting on the video, users expressing a preference for the video, users sharing the video with at least one other user of the online system, or users posting the video to a user profile.

6. The method of claim 1, wherein the user interactions include at least one of a user commenting on a page, sharing the page with at least one other user of the online system, re-posting content posted on the page, sharing content posted by the page, or expressing a preference for a brand associated with the page.

7. The method of claim 1, wherein each source of the plurality of sources corresponds to a brand page providing the videos for presentation to users of the online system, wherein the brand page is maintained by the online system.

8. The method of claim 1, wherein each subsequent user interaction performed by a user with a source within a specified time period is weighted heavier than a first user interaction performed by the user with the source.

9. The method of claim 1, wherein the content items are in-stream video advertisements presented within a video.

10. A method comprising:
obtaining, by an online system, video views for each of a plurality of videos during a previous time period, each video of the plurality of videos being associated with a source of a plurality of sources in the online system;
obtaining user interactions with the plurality of sources by users of the online system;
determining a brand value for the source of each video of the plurality of videos based at least in part on a number of user interactions with the source providing the video;
determining, for a current time period, a content item inventory of a plurality of content items to present within videos being presented to the users of the online system in the current time period;
determining a brand value threshold such that a projected demand for the plurality of videos in the current time period for sources of the plurality of sources having a brand value at least meeting the brand value threshold equals a number of content items in the content item inventory;
for each video impression opportunity to present a content item within a video to a user in the current time period, determine the brand value for the source of the video associated with the video impression opportunity;
responsive to the brand value for the source of the video being greater than the brand value threshold, performing a selection process to select the content item for inclusion within the video from a plurality of content items based on an affinity score between the user and each of a plurality of candidate content items and a bid amount associated with the candidate content item; and
responsive to the brand value for the source of the video being less than the brand value threshold, determining not to perform the selection process to select the content item for inclusion within the video.

11. The method of claim 10, wherein determining the brand value threshold comprises:
ranking each of the video views by the brand value for the source of the video; and
allocating each content item in the content item inventory to a portion of the number of video views from the previous time period, the brand value of a lowest allocated video view defining the brand value threshold, wherein each content item in the content item inventory is allocated to the portion of the number of video views from the previous time period includes allocating the content items to the portion of the number of video views with a highest brand value until all the content items are allocated.

12. The method of claim 10, wherein the user interactions include at least one of a user commenting on a page, sharing the page with at least one other user of the online system, re-posting content posted on the page, sharing content posted by the page, or expressing a preference for a brand associated with the page.

13. The method of claim 10, wherein each source of the plurality of sources corresponds to a brand page providing the videos for presentation to users of the online system, wherein the brand page is maintained by the online system.

14. A non-transitory computer-readable storage medium including instructions that, when executed by a processor, cause the processor to:
obtain video views for each of a plurality of videos during a previous time period, each video of the plurality of videos being associated with a source of a plurality of sources in an online system;
obtain user interactions with the plurality of sources by users of the online system;
determine a brand value for the source of each video of the plurality of videos based at least in part on a number of user interactions with the source providing the video;
determine, for a current time period, a content item inventory of a plurality of content items to present within videos being presented to the users of the online system in the current time period;
determine a brand value threshold for presenting content items to users in the current time period based on the content item inventory, the brand value threshold being determined by:
ranking each of the video views by the brand value for the source of the video; and
allocating each content item in the content item inventory to a portion of the number of video views from the previous time period, the brand value of a lowest allocated video view defining the brand value threshold;
for each video impression opportunity to present a content item within a video to a user in the current time period, determine the brand value for the source of the video associated with the video impression opportunity;
responsive to the brand value for the source of the video being greater than the brand value threshold, perform a selection process to select the content item for inclusion within the video from a plurality of candidate content items based on an affinity score between the user and each of a plurality of candidate content items and a bid amount associated with the candidate content item; and responsive to the brand value for the source of the video being less than the brand value threshold, determine not to perform the selection process to select the content item for inclusion within the video.

15. The non-transitory computer-readable storage medium of claim 14, wherein allocating each content item in the content item inventory to a portion of the number of video views from the previous time period includes allocating the content items to the portion of the number of video views with a highest brand value until all the content items are allocated.

16. The non-transitory computer-readable storage medium of claim 14, wherein determining the brand value threshold further comprises:

generating a histogram of video views by the brand value for the source of each video of the plurality of videos.

17. The non-transitory computer-readable storage medium of claim 14, wherein the content items are in-stream video advertisements presented within a video.

18. The non-transitory computer-readable storage medium of claim 14, wherein the user interactions include at least one of a user commenting on a page, sharing the page with at least one other user of the online system, re-posting content posted on the page, sharing content posted by the page, or expressing a preference for a brand associated with the page.

19. The non-transitory computer-readable storage medium of claim 14, wherein each source of the plurality of sources corresponds to a brand page providing the videos for presentation to users of the online system, wherein the brand page is maintained by the online system.

20. The non-transitory computer-readable storage medium of claim 14, wherein each subsequent user interaction performed by a user with a source within a specified time period is weighted heavier than a first user interaction performed by the user with the source.

* * * * *